United States Patent [19]

Heitkamp et al.

[11] Patent Number: 4,486,481
[45] Date of Patent: Dec. 4, 1984

[54] EXCHANGE-DISCHARGE BODY WITH REACTIVE MATERIAL

[75] Inventors: Dieter Heitkamp; Klaus Wagener, both of Jülich, Fed. Rep. of Germany

[73] Assignee: Kernforschungsanlage Jülich Gesellschaft mit beschränkter Haftung, Jülich, Fed. Rep. of Germany

[21] Appl. No.: 526,504

[22] Filed: Aug. 25, 1983

Related U.S. Application Data

[63] Continuation of Ser. No. 319,889, Nov. 10, 1981, abandoned, which is a continuation of Ser. No. 137,605, Apr. 7, 1980, abandoned.

[30] Foreign Application Priority Data

Apr. 7, 1979 [DE] Fed. Rep. of Germany ....... 2914079

[51] Int. Cl.³ ............................................. B01J 47/10
[52] U.S. Cl. .................................. 428/65; 210/502.1; 428/134; 428/913
[58] Field of Search ............... 210/679, 680, 150, 151, 210/483–485, 501–509; 428/4, 5, 357, 375, 397, 400–402, 542, 65, 134, 913; 422/102, 211, 220

[56] References Cited

U.S. PATENT DOCUMENTS

| | | | |
|---|---|---|---|
| 3,232,865 | 2/1966 | Quinn et al. | 210/150 |
| 3,976,570 | 8/1976 | McCray | 210/680 |
| 4,041,113 | 8/1977 | McKeown | 210/150 |
| 4,195,043 | 3/1980 | Foote et al. | 210/150 |
| 4,197,287 | 4/1980 | Piasio et al. | 422/102 |

Primary Examiner—Ivars Cintins
Attorney, Agent, or Firm—Becker & Becker, Inc.

[57] ABSTRACT

Exchange-discharge bodies provided with reactive material, especially for trace-material concentration from large water masses. The exchange bodies comprise a mechanically stable outer contour, and have a fluid accessible reactive upper surface protected against mechanical access by adjacent bodies.

1 Claim, 8 Drawing Figures

EXCHANGE-DISCHARGE BODY WITH REACTIVE MATERIAL

This is a continuation of application Ser. No. 319,889, filed Nov. 10, 1981—Dieter Heitkamp et al, which is a continuation of application Ser. No. 137,605, filed Apr. 7, 1980—Dieter Heitkamp et al, both now abandoned.

The present invention relates to an exchange-discharge body or bulk material element with reactive material, especially for trace material concentration from large water masses.

The separation or isolation of trace materials from larger fluid masses is a problem which arises during decontamination, but especially also during recovery of raw material, especially from sea water. For such an isolation, there can basically be relied upon exchange phenomena such as adsorption or ion exchange, which lead to a concentration, of the material to be separated, on solid material surfaces. Accordingly, methods were already described according to which larger water masses are brought into engagement with adsorber bodies in the form of plates, pipes, or fixed bed charges.

According to an earlier disclosure, U.S. patent application Ser. No. 104,812—Heitkamp et al, filed Dec. 18, 1979, now abandoned and replaced by continuation application Ser. No. 262,829—Heitkamp et al filed May 12, 1981, belonging to the assignee of the present invention and based upon German Patent Application Ser. No. P2854679.4-24 of Dec. 18, 1978, sinkable and concentration active exchange bodies designated as carrier bodies or adsorber particles are released in a natural flow which the bodies automatically pass through because of the different density. The particles, which have sunk and have been carried further a certain distance in the direction of flow, are then again collected and sent into a plant for regeneration accompanied by the recovery of the collected trace material.

According to a further disclosure, copending application U.S. Ser. No. 104,811—Heitkamp et al filed Dec. 18, 1979, now abandoned and replaced by continuation application Ser. No. 262,828—Heitkamp et al filed May 12, 1981, belonging to the assignee of the present invention, and based upon German Patent Application Ser. No. P 29 14 203.8-41 of Apr. 7, 1979, concentration active exchange bodies are to be released at a predetermined depth in water masses, such as especially a sea flow; these bodies are lighter than water and therefore automatically pass through the liquid because of their buoyancy.

The exchange bodies or bulk material elements used for one or the other disclosed method must, aside from their special densities differing from that of water, such densities being capable of being attained by suitable material selection of porosity, satisfy or suffice for certain requirements: the bodies on the one hand must withstand mechanical loading during transporting, discharging, collecting, filtering, and chemical working, and on the other hand must be exchange active.

It is an object of the present invention to provide exchange bodies which meet these requirements.

This object, and other objects and advantages of the present invention will appear more clearly from the following specification in connection with the accompanying drawing in which.

Figure 7:
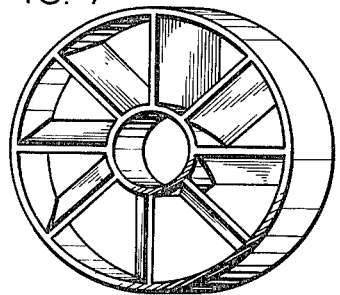
Figure 8:
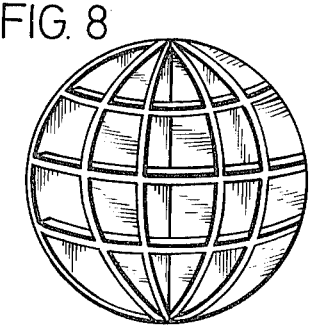

FIG. 7 shows an annular body provided with twist-guide surfaces which extend essentially radially but not axially parallel to force an automatic spinning or twist movement; and FIG. 8 shows a further embodiment having two or more discs extending vertically with respect to each other to generate a body framework with additional crossbeams or curved pieces to protect against contact with neighboring parts.

The inventive exchange-discharge bodies or bulk material elements are essentially characterized by a mechanically stable outer contour, especially with an inert outer surface, and a reactive surface that is fluid accessible yet protected against mechanical access by adjacent bodies.

With such exchange bodies, or bulk material elements, no substance losses are caused by mechanical stress; these losses would affect a continuous cyclic operation. Moreover, provision is made, by a fluid-accessible reactive surface protected however against mechanical access, for intensive exchange with the surrounding fluids, especially water masses.

Such exchange bodies are of interest not only for trace-material recovery from water masses, but also always when an intensive exchange of liquids, especially large liquid masses with solid materials, is to be brought about, as for example also during decontamination of large liquid quantities.

An especially expedient embodiment of the inventive exchange bodies is formed by generally annular or ring-shaped bodies with inert outer surfaces, as described in detail hereinafter, which can be formed from a stiff foil coated on one side. Such rings can provide "filling surfaces" on foil which are coated or reactively layered on both sides, including, for example, concentric rings or rosettes and the like.

Preferably, the diameter of such rings is greater than the height of the outer cylinder surface, whereby bodies result which are good to collect or catch, and have a good fluid access. In this connection, provision should be made for an automatic vertical adjustment or positioning of the ring axis, especially by a displacement of the center of gravity from the ring center, perhaps by a stabilizing ring at the end of the cylinder surface (which simultaneously can have a mechanical stiffening and/or density regulating effect). Such a displacement of the center of gravity can be attained, for instance, also by a conical profile of the outer ring, as described additionally in the following disclosure.

An additional requirement of the boundary surface exchange can be attained thereby that "propeller-type" guide surfaces are provided within an outer ring, these guide surfaces conveying a twist to the moved exchange body.

In place of such rings, the exchange bodies can also be formed by other structures, as for example bodies of interconnected or telescoped discs which, in the most simple embodiment, result from three circular disct at right angles to each other, with which, longitudinally of their spherical sleeve surface, additionally brackets or struts can be provided which preclude an interengagement of adjoining bodies.

Another example for an exchange body with stable outer contour and protected fluid-accessible surfacing would be a sponge-like or skein or balled-up or snarled reactive configuration with a protective perforated outer sleeve.

The exchange-active centers provided on or in the protected surfaces of the exchange bodies can exist in the material itself, as for instance with ion exchange material, or can be applied on an inert carrier material, which can be chemically attained, perhaps by chemical modifications or by plug or graft and the like or by physical-chemical steps, as for example by adhesion or physical activation. Especially easy to produce are rings with adhered flange and twist-guide surfaces or thread skeins with a net sleeve or hull.

It is also possible, for example, to first coat the surface of an especially light but sufficiently still inert carrier material (for instance of synthetic material), and then, by folding, bending, or other additional deformation, to form three-dimensional configurations in such a manner that these configurations during discharge can engage each other only with the edges of the coated or layered surfaces. The manner of formation must assure that no parts of coated or layered surfaces are engaged by corners or edges of another (identical-type) particle. A body of reactively coated, stiff, inert carrier material in foil or thread form can be provided, and can have a three-dimensional structure with coating-free outer surfaces.

As already indicated, the relative movement of the exchange bodies is to be so influenced by special formation that the water which flows past the formations comes into as much intimate contact with the reactive upper surfaces as possible, for which reason the hydrodynamic boundary layers on the solid body surfaces must be as thin as possible. The thickness thereof depends upon the relative speed between the solid bodies and the surrounding liquid, as well as upon the characteristic geometric dimensions of the body around which the flow occurs. An exchange body resulting from folding the surface-providing material should additionally have openings therethrough, if possible in all directions, in order to assure the unhindered flow of the water therethrough and to avoid dead corners and angles.

Figure 1:
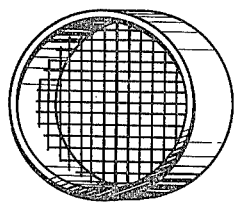
FIG. 1 shows an annular or ring body provided with a net or grid.

Referring now to the drawings in detail, FIG. 1 shows an especially simple example of a short cylinder ring, the inwardly directed surface of which is reactively coated or layered. Rings of similar size cannot engage each other along the inner surfaces thereof. In order to avoid an elastic deformation of the rings, such as when subject to higher discharge pressure, the cylinder ring can be externally provided with a reinforcing rib. The ring can additionally have an inner netlike or gridlike structure, of reactive material, which in this location is equally protected against engagement. This grid or net need not be even, but rather can have a configuration suitably created by folding, winding, bending, and the like.

Figure 2:
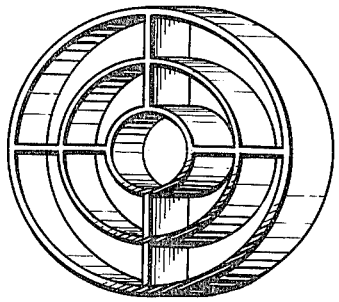
FIG. 2 shows another annular body provided with concentric rings interconnected by radial struts.

FIG. 2 shows several rings arranged concentrically; the inner rings can be reactively coated or layered on both sides. In this manner, there is attained a greater effective surface. Such rings additionally have an improved mechanical stability and can be dimensioned suitably large without great dead volume, thus technically facilitating the separation thereof from fluid and, for instance, reducing the flow resistance of nets or grids used for this purpose.

Figure 4:
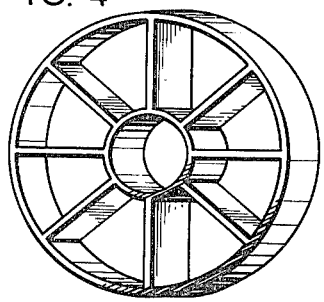
FIG. 4 shows an annular body having radial struts and a central annular ring-shaped hub.

FIG. 4 shows two concentric rings which are connected to each other by spoke-type webs. Such bodies have a still higher mechanical stability.

Figure 5:
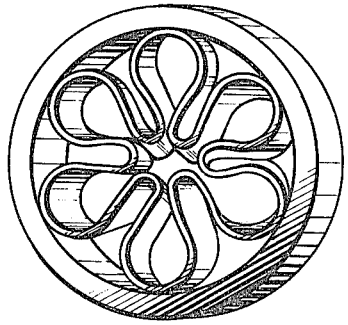
FIG. 5 shows an annular body with a conical cross sectional profile for stabilization of the ring axis in the direction of movement, and is provided with a rosette arrangement secured within the confines of the annular body.

According to FIG. 5, there is provided an outer ring with a rosette-type formation coated or layered on both sides and arranged inside the outer ring. In this manner, an especially large surface is attained.

Figure 6:
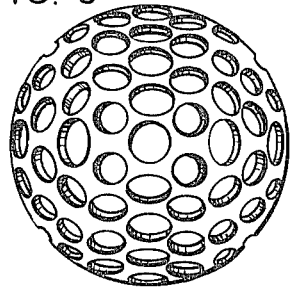
FIG. 6 illustrates a perforated hollow sphere or ball forming a casing or jacket for sponge or balled-up snarled material layered reactively or reactive in itself.

FIG. 6 shows a sieve- or screen-type perforated hollow sphere or ball as a sleeve or hull for reactive or reactively coated material in balled-up configuration or in sponge form and the like, and suitably also in the form of folded foils and the like.

The sample embodiments described in the foregoing paragraphs have in common the advantage that the linear dimensions of the interchange bodies decisive for the thickness of the hydrodynamic boundary layer, the mantle thickness with the rings, or the thread thickness with a net or balled-up configuration, is considerably smaller than the entire diameter of the exchange body, which determines the mesh width and accordingly determines the flow resistance of the filter net and retention net to be used. Consequently, a thin boundary layer, and accordingly an advantageous exchange kinetic, can be attained also with good retention and filtration capability.

Figure 3:
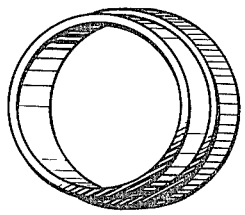
FIG. 3 shows an annular body having an additional ring located on the outer periphery at one end thereof.

FIG. 3 shows an annular exchange body with a so-called stabilizing ring which is made especially of sea-water-resistant material and which can be drawn upon for adjustment of the density of the entire body, which then according to the attained density can serve as a sinking body or uplift or buoyant body. By means of a density difference between this stabilizing ring and the remainder of the body, there can additionally be attained that upon the outer ring relatively stronger uplift or gravitational forces are effective which, during the rising or sinking in the sea, keep the entire body in a stable position with the (pole-) axis in the direction of movement, so that an optimum through-flow is guaranteed.

A further improvement of the exchange kinetic can finally be attained thereby that the exchange body has an automatic spinning movement forced thereon by way of an asymmetrical formation or by way of an essentially radial but not axially parallel guide surface, as shown in FIG. 7.

A similar position stabilization as by way of the additional ring according to FIG. 3 can also be attained by a conical profile of the annular exchange body as illustrated in FIG. 5. This ring surface, expanded on one end face, can likewise be drawn or relied upon for adjustment of the desired sinking or buoyancy forces by an appropriate porosity or by insertion of density increasing material.

FIG. 8 shows, as a further example, circular discs interfitted or inserted with respect to each other to result in a spherical outer contour.

The present invention is, of course, in no way restricted to the specific disclosure of the specification and drawing, but also encompasses any modifications within the scope of the appended claims.

What we claim is:

1. A system for treating large bodies of liquid by exchange, the system comprising multiple independent elements which have a density different from that of the liquid body, wherein when the elements are released in the liquid body the elements travel through the liquid body; each element being configured with a stiff outer ring formed about an axis and having a diameter greater than its length; an open frame extending within each of the rings; the open frame having a reactive surface for effecting an ion exchange with material in the body of liquid as the elements travel through the liquid, and wherein the open frame is configured with radially extending blades each of which slants at an angle with respect to the axis of the ring whereby the elements spin about their axis as they travel through the liquid; and means included with each element for orienting the axis of the element vertically as the element travels through the liquid.

* * * * *